United States Patent [19]

Meehan

[11] Patent Number: 5,390,894
[45] Date of Patent: Feb. 21, 1995

[54] POUR CUP

[75] Inventor: James E. Meehan, Hopewell Township, Mercer County, N.J.

[73] Assignee: Carter-Wallace, Inc., New York, N.Y.

[21] Appl. No.: 165,384

[22] Filed: Dec. 10, 1993

[51] Int. Cl.⁶ ............................................. B29C 33/10
[52] U.S. Cl. ....................................... 249/96; 249/117; 249/141; 425/812
[58] Field of Search ................. 249/90, 93, 96, 117, 249/141; 425/808, 812

[56] References Cited

U.S. PATENT DOCUMENTS

| | | | |
|---|---|---|---|
| 3,028,002 | 4/1962 | Nicolle | 249/141 |
| 4,113,224 | 9/1978 | Clark et al. | 249/117 |
| 4,369,158 | 1/1983 | Woodruff et al. | 425/812 |
| 4,518,553 | 5/1985 | Yarossi et al. | 264/234 |
| 4,552,161 | 11/1985 | Hill et al. | 132/318 |
| 4,722,836 | 2/1988 | Geary et al. | 424/68 |

Primary Examiner—James P. Mackey
Attorney, Agent, or Firm—Watov & Kipnes

[57] ABSTRACT

A pour cup for shaping one end of a product stick in a process for bottom filling a container with the product, comprising a concave surface, a sealing ledge around the periphery of the surface, a wall along the outside of the ledge, channels in the wall that terminate a given distance from the ledge, and an elongated shell surrounding said wall.

6 Claims, 5 Drawing Sheets

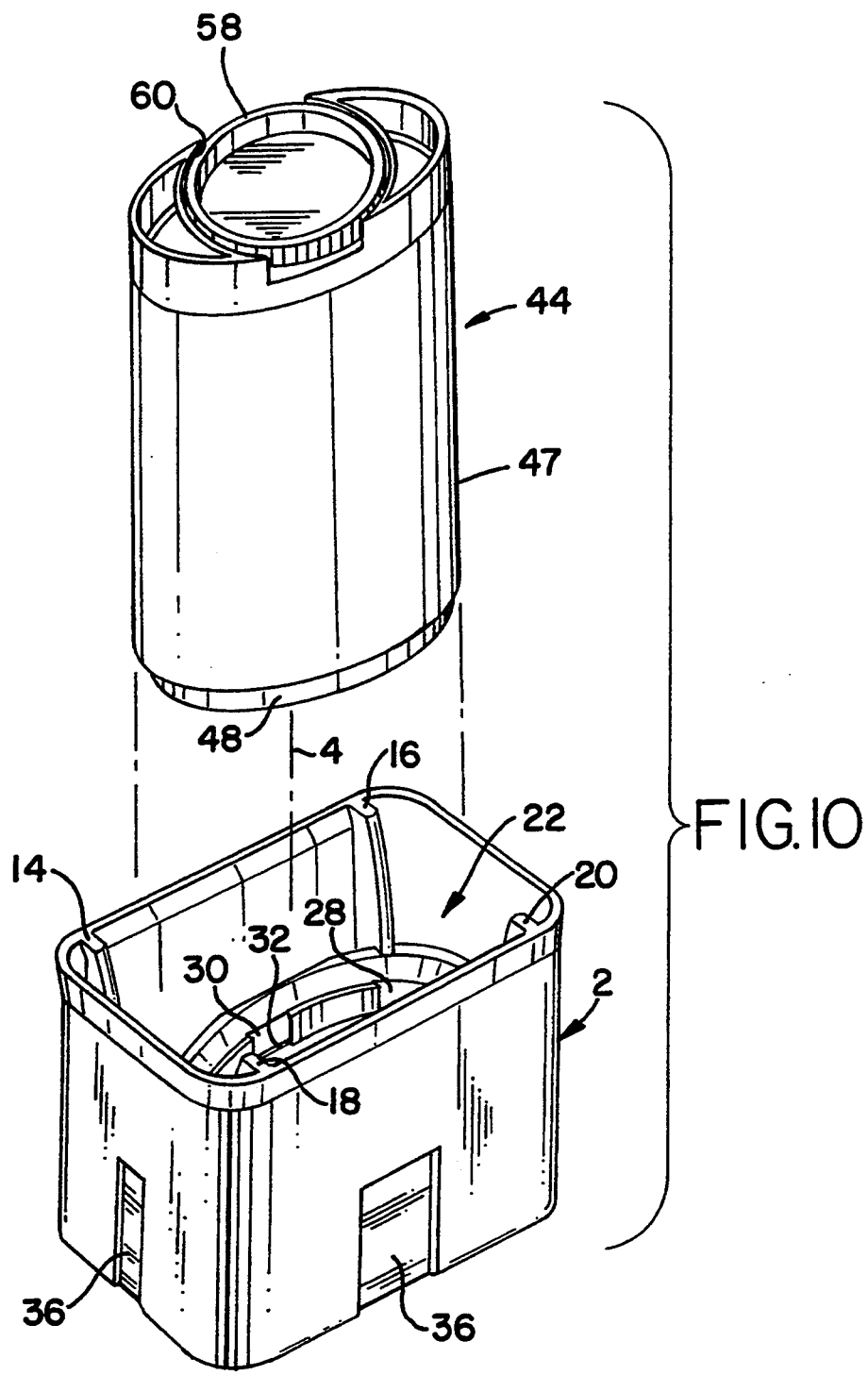

POUR CUP

FIELD OF THE INVENTION

This invention is in the field of apparatus for bottom filling product dispensers with product.

BACKGROUND OF THE INVENTION

Products such as antiperspirant are often dispensed in the form of sticks of wax-like consistency that are ejected from the top of a product container as the material is used.

Dispensers of this type have been assembled by pouring material that has been heated into a liquid state into the top of the container and letting it cool to form a solid, but this results in the application end of the stick being flat. Recently, that end of the stick has been made to have a more desirable convex shape by pouring the material into the bottom of the container while its top is in sealed contact with a concave mold that is part of an assembly hereinafter referred to as a pour cup. After the pouring is done, and while the material is soft, an ejection mechanism is inserted into the bottom of the container and embedded in the material. When the material has hardened, the container and product stick it contains are removed from the pour cup. Thus the pour cup is only used in the manufacturing process and is not part of the dispenser.

One of the problems that has been experienced in the bottom fill method just described has been difficulty in removing the container from the pour cup. This results from the fact that the seal between the container and the pour cup creates a vacuum between the product material and the mold so that ambient air pressure forces the container and the cup together with considerable force.

Another difficulty experienced during manufacture is that when the pour cups are changed from an in-line formation to a parallel formation in what is known as a bulk accumulator, they can become misaligned.

A further problem is that when one row of pour cups is forced against the next row as it is being carried along a conveyor belt, a phenomenon known as shingling occurs in which the pour cups become tilted.

Both misalignment and tilting interfere with automatic pouring as well as with the automatic insertion of the ejection mechanism into the container because either can cause a cup to be incorrectly positioned.

BRIEF SUMMARY OF THE INVENTION

A pour cup of this invention is generally comprised of a hollow housing having two pairs of opposed parallel exterior sides and a mold located in one end of the housing. The mold has a concave surface facing the other end of the housing. The dimension of the sides in a direction parallel to the axis of the housing is sufficient to prevent misalignment in a bulk accumulator and to prevent them from being tipped when one pushes against another, thus eliminating the shingling problem.

In the pour cups of the prior art, a sealing ledge for one end of the product container is formed around the periphery of the concave surface, and a wall extends around the outer edge of the ledge. In a pour cup of this invention, channels are formed in the inside of the wall that start at a given distance from the sealing ledge. The given distance is so small, 0.010 inch, for example, that only slight cocking movement of the product container is required to connect the lower end of a channel to the inside of the mold and break any vacuum therein. Thus the channels serve as vacuum breaks.

BRIEF DESCRIPTION OF THE DRAWINGS

Various embodiments of the present invention are described below with reference to the drawings, in which similar components are identified by the same reference designation, wherein:

FIG. 10 is an exploded view of a pour cup of this invention and a product dispenser after they are separated.

DETAILED DESCRIPTION OF THE INVENTION

Figure 1:
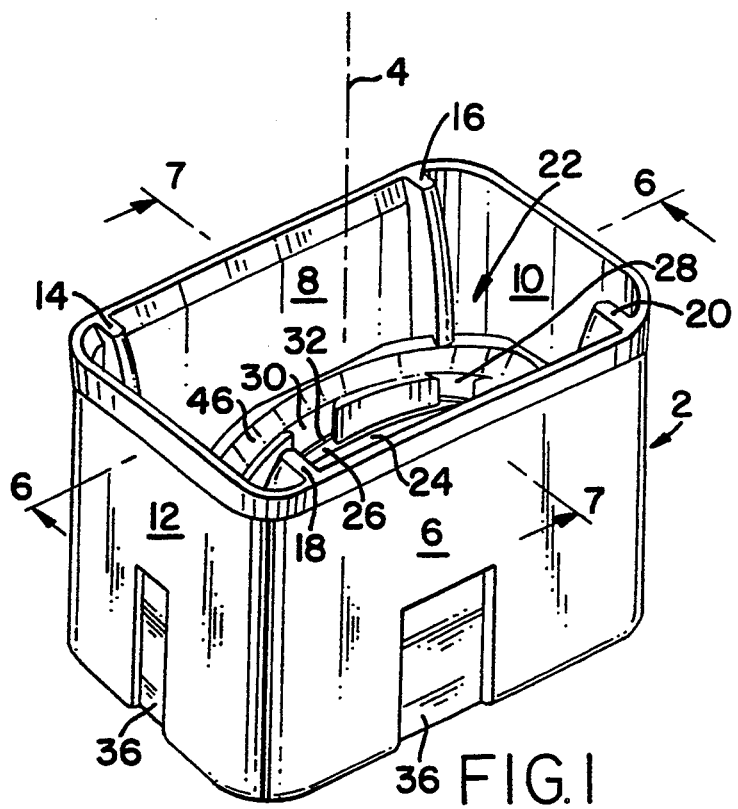
FIG. 1 is a perspective view of the top of a pour cup constructed in accordance with one embodiment of this invention.

In the perspective view of a pour cup of this invention shown in FIG. 1, a hollow rectangular shell 2 having an axis 4 is formed by opposed parallel side walls 6 and 8 and opposed parallel end walls 10 and 12. The corners of the shell 2 may be rounded as shown. Ribs 14 and 16 on the inside of the side wall 8 and ribs 18 and 20 on the inside of the side wall 6 extend in a direction parallel to the axis 4. A mold 22 that is formed in one end of the shell 2 in a manner to be described includes a concave surface 24 that is only partly visible for shaping the application end of a product stick.

Surrounding the concave surface 24 is a sealing ledge 26 against which an end lip of a product container is pressed when the product material is being poured. The inside surface of a wall 28 extends perpendicularly from the outer edge of the sealing ledge 26 and has channels such as indicated at 30 therein.

Figure 1A:
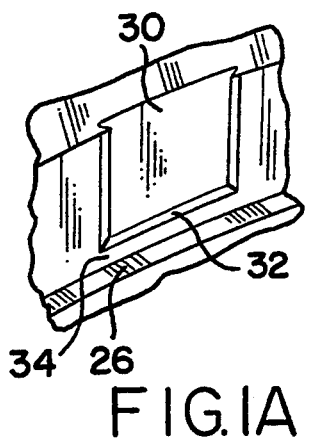
FIG. 1A is an enlarged view of a portion of FIG. 1.

A channel 30 is more clearly shown in the enlargement of a portion of FIG. 1 that is shown in FIG. 1A. Note that the closed end 32 of the channel 30 is spaced from the sealing ledge 26 by a small given distance 34, such as 0.010 inch. The distance 34 is exaggerated for purposes of illustration. As previously mentioned, when one end of a product container is pressed so as to form a seal with the ledge 26 and the product material is poured into the container, air is excluded from the interface of the product and the concave surface 24 so that ambient air pressure pushes the container against the sealing ledge 26 with considerable force. Prior art pour cups do not have channels 30 so that it is difficult to remove the product containers from them. But the container can be easily removed from a pouring coup of this invention by cocking it slightly until air in at least one channel 30 reaches the interface between the application end of the product stick and the concave surface 24 of the mold 22 so as to break the vacuum.

Figure 2:
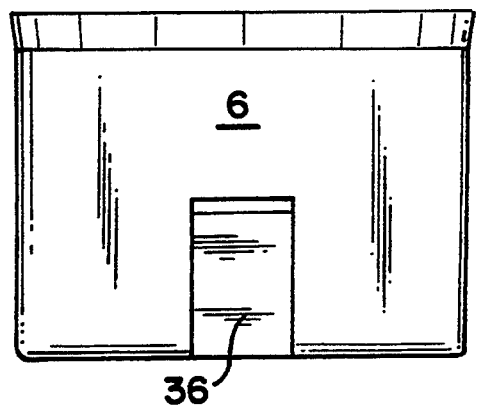
FIG. 2 is a side elevational view of a pour cup of this invention, whereby the opposite side elevational view is identical.
Figure 3:
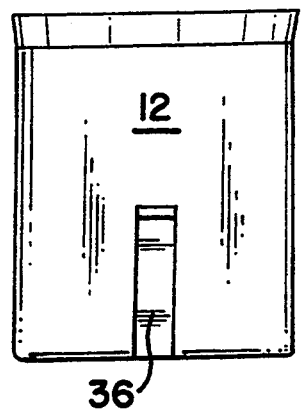
FIG. 3 is an end elevational view of a pour cup of this invention, the opposing end elevational view being identical.

As seen in FIGS. 2 and 3, indentations 36 are formed in the outer surfaces of the side walls 6 and 8 and the end walls 10 and 12 to reduce the amount of plastic material to lessen the potential heat sinking or warping of the pour cups 2 during and after molding.

Figure 4:
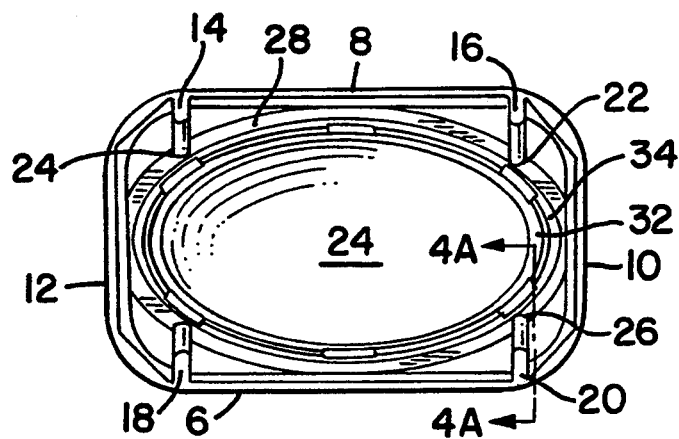
FIG. 4 is a top view of a pour cup of this invention.
Figure 4A:
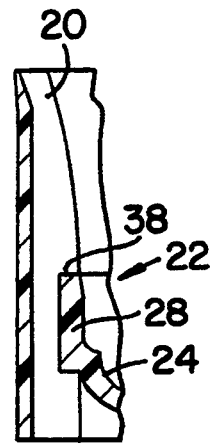
FIG. 4A is a cross section taken along 4A—4A of a portion of FIG. 4.
Figure 5:
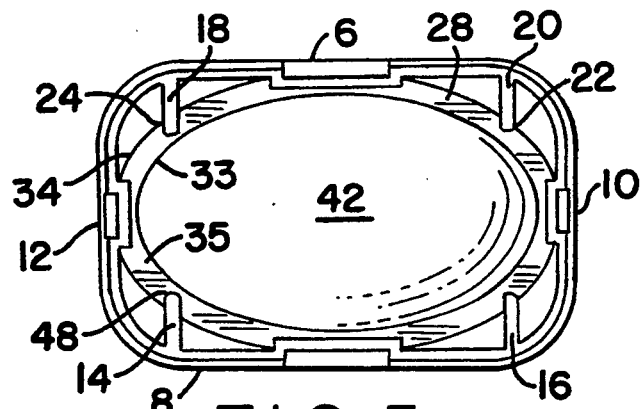
FIG. 5 is a bottom view of a pour cup of this invention.
Figure 6:
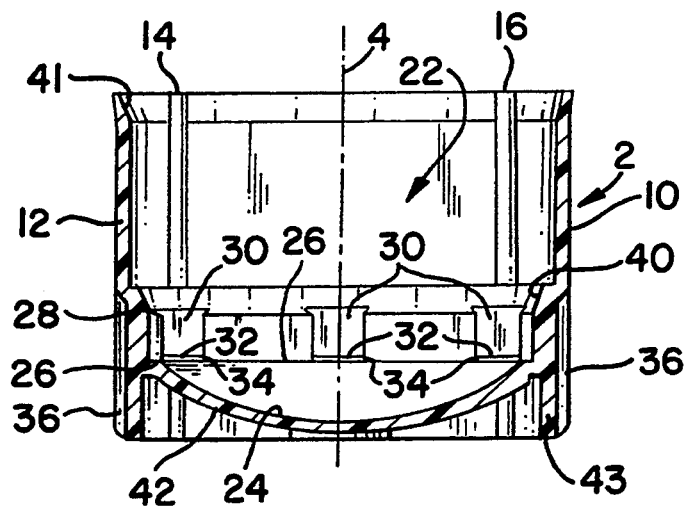
FIG. 6 is a cross section taken along 6—6 of FIG. 1.
Figure 7:
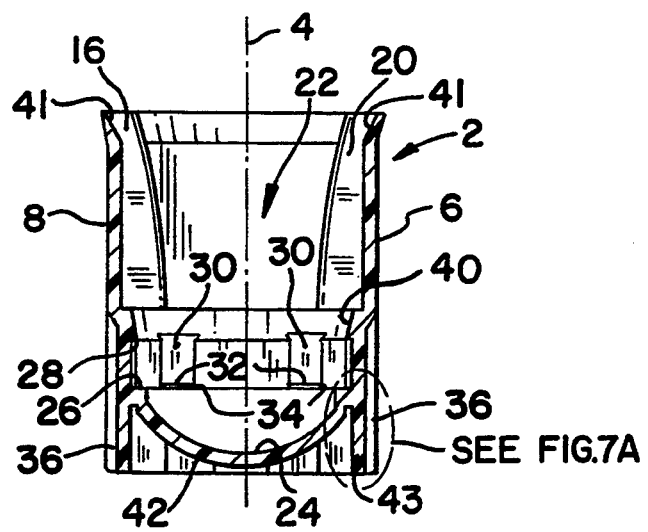
FIG. 7 is a cross section taken along 7—7 of FIG. 1.
Figure 7A:
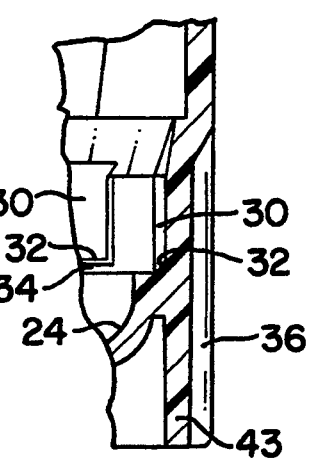
FIG. 7A is an enlarged view of a portion of the cross section of FIG. 7.

The construction features of a pour cup that have just been described as well as others will be more clearly understood from a consideration of the FIGS. 4, 4A, 5, 6, 7, 7A, and 8. This embodiment of the invention can be formed by a center gated injection molding process in which there are two cavities so as to form male and female domes. In order to facilitate this process, the mold 22 is an integral part of the pour cup rather than being a separate piece. As can be seen in the top view of the pour cup shown in FIG. 4 and the bottom view shown in FIG. 5, the periphery of the concave surface 24 is ellipsoidal in this particular embodiment so that the wall 28 surrounding it intersects the walls 6, 8, 10 and 12 at their mid points. The cross section taken along 6—6 of FIG. 1, as shown in FIG. 6, is taken at the points where the wall 28 intersects the end walls 10 and 12, and the cross section 7—7 shown in FIG. 7 is taken at points where the wall 28 intersects the side walls 6 and 8. In this embodiment, the wall 28 is an integral part of the portion of the walls 6, 8, 10 and 12 where the indentations 36 are located.

As can be seen in FIGS. 4 and 5, the ribs 14, 16, 18, and 20 occur at points where the side walls 6 and 8 are spaced from the ellipsoidal wall 28. FIG. 4A is an expansion of a section 4A—4A of the rib 20 showing a notch 38 that fits around the wall 28 so as to provide support for the mold 22. Notches such as 38 are formed in each of the other ribs 14, 16 and 18.

In FIGS. 6 and 7, the upper inner surface 40 of the wall 28 and the upper inner surfaces 41 of the walls 4, 6, 8, and 10 slope outwardly so as to guide the insertion of the product container to the sealing surface 26. The surface 42 of the mold 22 that is opposite the concave surface 24 may be convex so that the side and end walls of the pour cup form a skirt 43 extending below the wall 28.

Figure 8:
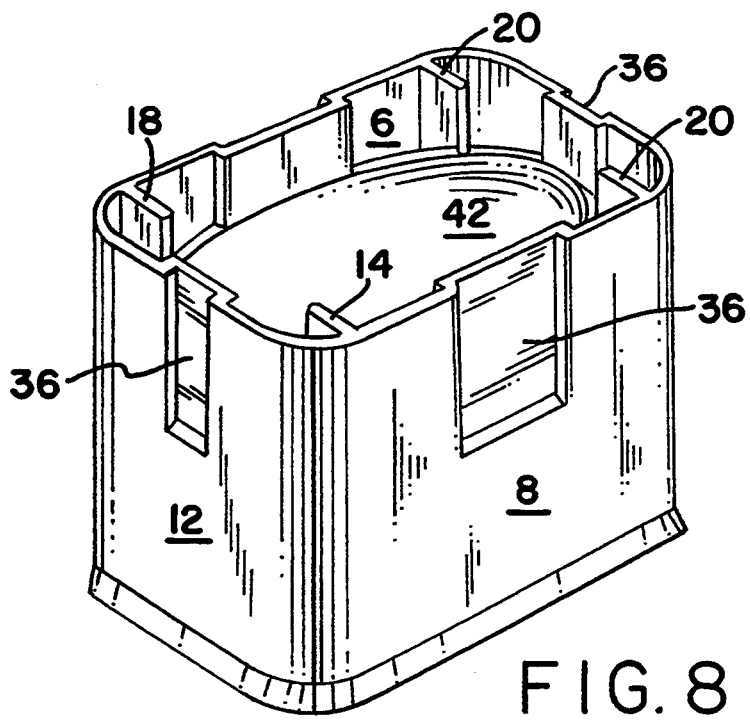
FIG. 8 is a perspective view of the bottom of a pour cup of this invention.

FIG. 8 is a perspective view of the bottom of a pour cup of this invention in which the convex surface 42 is shown.

Figure 9:
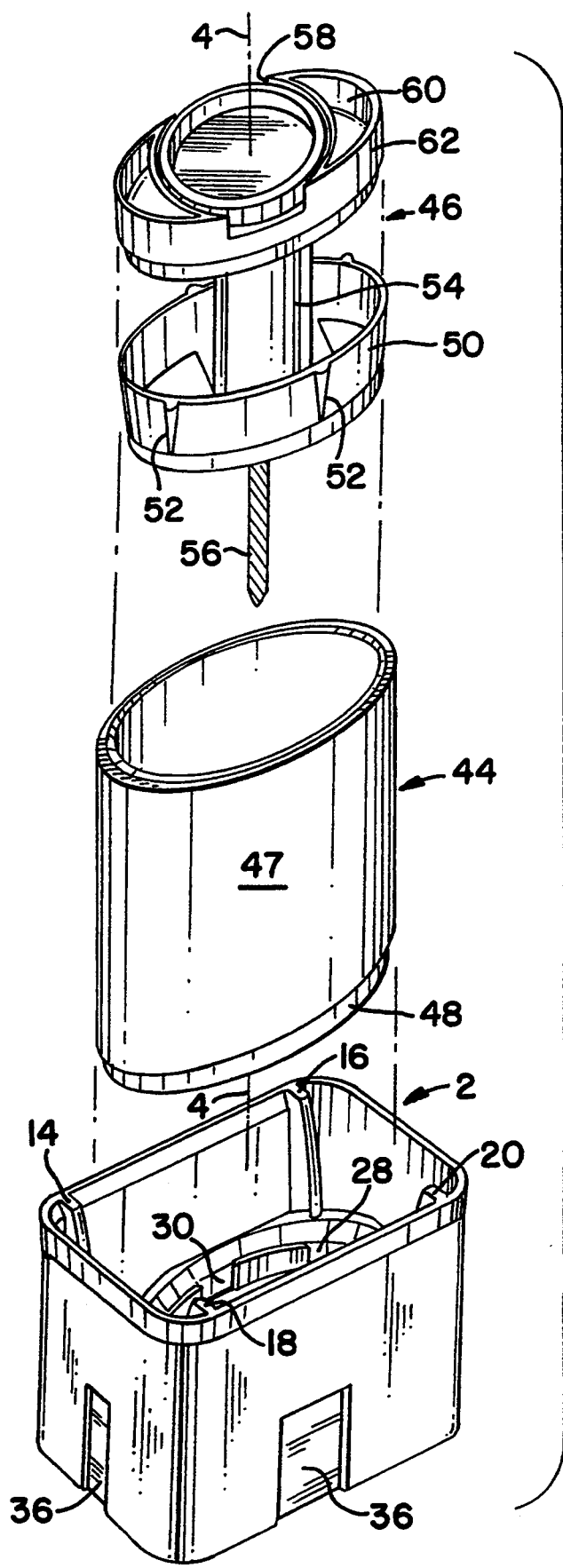
FIG. 9 is an exploded view of an injection mechanism, a product container and a pour cup of an embodiment of this invention.

Reference is made the exploded view of FIG. 9 for a description of the relationship between the pour cup housing 2, a product container 44 and an ejection mechanism 46. The axis of the product container 44 and of the ejection mechanism 46 are aligned with the axis 4 of the shell 2. The product container 44 is comprised of a hollow body 47 having an lip 48 of a reduced outer dimension extending from its lower end. The dimensions and shape of the lip 48 are such that its bottom will be in contact with the sealing ledge 26 and its outer surface in contact with the wall 28, when the container 44 is in position for pouring in product material. The channels 30 are then between the wall 28 and the lip 48. As previously noted, the bottoms of the channels are at a level that is slightly above (0.01 inch, for example) the sealing ledge 26. This prevents the liquid product from reaching the channels when it is poured into the container 44, but at the same time very little movement of the container 44 is required to provide communication between at least some of the channels 30 and the interface of the concave surface 24 of the mold 22 and the end of the product stick so as to break the vacuum and make it easy to remove the container 44 from the mold 22.

Various designs of an ejection mechanism may be used, but the particular one shown in FIG. 9 is comprised of a dish 50 having external runners 52 that are parallel to the axis 4. A concentric hollow cylinder 54 that is integral with the dish 50 is provided with a threaded portion, not shown, at its bottom. A screw 56 mates with the threaded portion and is attached at its other end to a knurled knob 58. The knob 58 is within a recess 60 in a top 62 that is affixed to the upper end of the product container 44. Thus, as the product is used, the knurled knob 58 is turned so as to advance the dish 50 and push the product stick through the lip 48.

Although various embodiments of the invention have been shown and described herein, they are not meant to be limiting. Those of skill in the art may recognize modifications to these embodiments, which modifications are meant to be covered by the spirit and scope of the appended claims.

What is claimed is:

1. A pour cup for shaping one end of a product stick in a bottom filling process, comprising:
   means forming a concave surface;
   a sealing ledge around the periphery of said surface;
   a wall around the outer edge of said sealing ledge; and
   means forming channels in the inside of said wall that terminate a given distance from said sealing ledge.

2. A pour cup as set forth in claim 1, wherein said given distance is less than ten thousandths of an inch.

3. A pour cup as set forth in claim 1, wherein the inside of the top of said wall is beveled.

4. A pour cup as set forth in claim 1, further comprising:
   a hollow shell of rectangular cross section having an axis that is coaxial with the axis of said concave surface; and
   one end of said shell being attached to the outside of said wall in such orientation that the concave surface faces the other end of said shell.

5. A pour cup as set forth in claim 4 wherein the dimension of said shell parallel to said axis is sufficient to prevent one shell from tipping another when they are pushed together.

6. A pour cup comprising:
   a first pair of opposed walls having parallel external planar surfaces;
   a second pair of opposed walls having parallel external planar surfaces;
   said walls forming a hollow shell having an axis;
   a mold mounted in one end of said shell;
   said mold having a concave surface facing the other end of said shell;
   a sealing ledge extending around the periphery of said concave surface;
   a peripheral wall extending parallel to said axis around the periphery of said sealing ledge; and
   a plurality of channels formed on the inside of said peripheral wall, said plurality of channels each having one end a given distance from said sealing ledge.

* * * * *